(12) United States Patent
Mao et al.

(10) Patent No.: US 11,904,400 B2
(45) Date of Patent: Feb. 20, 2024

(54) ELECTROCHEMICAL DISCHARGE-ENABLED MICRO-GRINDING PROCESS FOR MICRO-COMPONENTS OF SILICON-BASED MATERIALS

(71) Applicant: Changsha University of Science and Technology, Hunan (CN)

(72) Inventors: Cong Mao, Hunan (CN); Weidong Tang, Hunan (CN); Yuanqiang Luo, Hunan (CN); Yinghui Ren, Hunan (CN); Wei Li, Hunan (CN); Mingjun Zhang, Hunan (CN); Kun Tang, Hunan (CN); Gang Wu, Hunan (CN); Yongle Hu, Hunan (CN); Feng Shi, Hunan (CN); Ziyang Chen, Hunan (CN); Zhuo Wen, Hunan (CN)

(73) Assignee: Changsha University of Science and Technology, Changsha (CN)

( * ) Notice: Subject to any disclaimer, the term of this patent is extended or adjusted under 35 U.S.C. 154(b) by 138 days.

(21) Appl. No.: 17/733,109

(22) Filed: Apr. 29, 2022

(65) Prior Publication Data
US 2023/0294189 A1 Sep. 21, 2023

(30) Foreign Application Priority Data
Mar. 16, 2022 (CN) .......................... 202210255855.3

(51) Int. Cl.
*B23H 5/04* (2006.01)
*B23H 9/02* (2006.01)
(Continued)

(52) U.S. Cl.
CPC ................ *B23H 9/02* (2013.01); *B23H 3/02* (2013.01); *B23H 3/08* (2013.01); *B23H 5/04* (2013.01); *B23H 2300/10* (2013.01)

(58) Field of Classification Search
CPC ....................................................... B23H 5/04
See application file for complete search history.

(56) References Cited

FOREIGN PATENT DOCUMENTS

| CN | 102220625 A | 10/2011 |
|---|---|---|
| CN | 102373494 A | 3/2012 |

(Continued)

OTHER PUBLICATIONS

Chen, Study on High-frequency Pulse Electrochemical Discharge Combined Precision Milling and Grinding Technology (Year: 2021).*

(Continued)

*Primary Examiner* — Hosung Chung

(57) ABSTRACT

This paper describes an invention involving an electrochemical discharge-enabled micro-grinding process for micro-components of silicon-based materials. The specific machining method is described below. A micro-grinding tool and an auxiliary electrode are respectively connected to the negative and positive electrodes of a pulsed DC power supply. When the current flows through the loop, an electrochemical hydrogen evolution reaction (HER) occurs at the micro-grinding tool in the grinding fluid, which generate multiple hydrogen bubbles. The bubbles coalesce into an insulating gas film and separate the micro-grinding tool from the grinding fluid; when the critical voltage is reached, the gas film is broken down and an electrochemical discharge occurs accompanied by discharge spark; under the action of the discharge spark, the surface material of the workpiece in the discharge-affected region is directly ablated to generate a heat-affected layer (HAL), namely, physical modification.

3 Claims, 4 Drawing Sheets

(51) Int. Cl.
B23H 3/02 (2006.01)
B23H 3/08 (2006.01)

(56) References Cited

FOREIGN PATENT DOCUMENTS

| CN | 105215487 A | 1/2016 |
| CN | 107119304 A | 9/2017 |
| CN | 111748285 A | 10/2020 |
| JP | 2009178770 A | 8/2009 |

OTHER PUBLICATIONS

Chen, Machine Translation, Study on High-frequency Pulse Electrochemical Discharge Combined Precision Milling and Grinding Technology (Year: 2021).*

Haoran Chen, "Study on High-frequency Pulse Electrochemical Discharge Combined Precision Milling and Grinding Technology", May 16, 2021, Shandong University.

* cited by examiner

ELECTROCHEMICAL DISCHARGE-ENABLED MICRO-GRINDING PROCESS FOR MICRO-COMPONENTS OF SILICON-BASED MATERIALS

CROSS REFERENCE TO RELATED APPLICATION

This application claims priority from the Chinese patent application 202210255855.3 filed Mar. 16, 2022, the content of which is incorporated herein in the entirety by reference.

TECHNICAL FIELD

The present invention is related to the technical field of micro-grinding, particularly to an electrochemical discharge-enabled micro-grinding process for micro-components of silicon-based materials.

BACKGROUND ART

Typical silicon-based materials include monocrystalline silicon, monocrystalline silicon carbide, silicon-based ceramics, etc., they have the features of high strength, excellent hardness, wear resistance, and difficult-to-conduct electricity. Silicon-based materials are mainly used to manufacture ultra-precise three-dimensional micro components such as microsensors, microfluidic devices, and micro-optical components that are increasingly applied in industries such as aerospace, microelectronics, and bioengineering.

Because the silicon-based materials have the features of high strength, excellent hardness, wear resistance, and difficult-to-conduct electricity, processing damages such as chipping, breakage, and cracking is often occur and it is hard to achieve both machining efficiency and accuracy at the same time. Therefore, an urgent need exists to develop a new processing method for high-precision and high-efficiency machining of micro-components of hard and brittle silicon-based materials that are difficult-to-conduct electricity and have high-melting point. The patent titled, Method for Polishing the Inner Wall of the Hole of the Workpiece Made of Hard and Brittle Conductive Materials (with the Publication No.: JP1986188024A), aims to improve the processing quality of the inner wall of the hole of the workpiece of hard and brittle materials. According to the method, the tool and the workpiece are respectively connected to the negative and positive electrodes of the DC power supply and placed in an electrolyte where free abrasive particles are evenly distributed. During machining, the conductive flexible tool serves as the electrochemical cathode, and is revolved and rotated against the hole wall under certain processing pressure. Accordingly, the inner wall of the in-process hole of the workpiece undergoes electrochemical anodic dissolution and a passive film is generated on the surface. The passive film is removed under the mechanical action of the incoming free abrasive particles when the flexible tool is rotated. This results in the low-damage processing of the inner wall of the hole of the workpiece of hard and brittle materials. Meanwhile, the technical solution also has following features: according to the passivation principle of the workpiece material, the chemical reaction between the workpiece under the electrochemical action and the grinding fluid falls within reactions at room temperature. The HAL will not appear during the passivation process, nor will the chemical reaction between the workpiece material and the grinding fluid be expedited due to a thermal effect; as the workpiece serves as an anode for an electrochemical reaction, it must be made of conductive material; since the passivated materials are removed by free abrasives, the processing efficiency is low.

SUMMARY

The invention provides an electrochemical discharge-enabled micro-grinding process for micro-components of silicon-based materials. The process is primarily characterized in that: electrochemical discharge technology is used in a processing area of a workpiece of silicon-based materials. With the technology, the surface material of the workpiece in the processing area is transformed to a modified layer under the coupled effect of physical and chemical modification. Moreover, the mechanical properties of the modified layer are significantly reduced. Finally, the modified layer is quickly and efficiently ground away using a micro-grinding tool, and the processing effect of high-precision, high-efficiency and low-damage is achieved. Meanwhile, the mechanical force between the micro-grinding tool and the workpiece is reduced, and the shape retention and service life of the micro-grinding tool are improved.

In order to achieve the aforesaid purpose, the technical solution of this invention can be implemented in the following steps. Step 1. Formation of gas film by electrochemical HER: when the current of the pulsed DC power supply flows through the loop, an electrochemical HER occurs at the micro-grinding tool in the grinding fluid. The $H^+$ ions in the grinding fluid obtain electrons from the cathode to generate hydrogen bubbles that adhere to the outer circumference of the micro-grinding tool. The hydrogen bubbles coalesce into an insulating gas film and separate the micro-grinding tool from the grinding fluid, thus, the HER is terminated. Meanwhile, an electrochemical oxygen evolution reaction (OER) occurs at the auxiliary electrode, the $OH^-$ ions in the grinding fluid loses electrons and generate oxygen bubbles. Since the size of the auxiliary electrode is larger than that of the micro-grinding tool by one to two orders of magnitude, the auxiliary electrode is unable to generate a gas film. Step 2. Electrochemical discharge: under the action of the voltage of a pulsed DC power supply, a large number of charged particles will accumulate on both sides of the insulating gas film and a local strong electric field is generated wherein free electrons with negative charges gather on the micro-grinding tool, and positive ions with positive charge gather in the grinding fluid. When the critical voltage is reached, the gas film is broken down, a discharge channel is generated between the micro-grinding tool and the grinding fluid; the high-speed directional movement of charged particles in the discharge channel leads to an electrochemical discharge accompanied by discharge spark. Step 3. Modification of workpiece material: the discharge spark directly ablates the adjacent workpiece, and the temperature of the workpiece located in the discharge center can raised to the melting temperature even gasification temperature that leading to the direct removal of such material; a heat-affected layer (HAL) is generated from the material of the workpiece located adjacent to the discharge center due to a sudden temperature change. This results in the ablation and softening of the workpiece, namely, physical modification of the surface material of the workpiece. Meanwhile, the temperature rise of the workpiece and the grinding fluid due to thermal effect of discharge spark causes a series of chemical reactions between the workpiece of silicon-based materials and the grinding fluid. The chemical reactions includes that $H_2O_2$ in the grinding fluid generate *OH under the catalysis of $Fe^{2+}$ ions, *OH react with silicon-based materials to generate $SiO_2$, and $SiO_2$ further reacts with $OH^-$ ions in the grinding fluid to generate silicate. Finally, the surface material of the workpiece is transformed from hard and brittle silicon-based materials to soft silicate, namely, chemical modification of the surface material of the workpiece; the HAL produced by physical modification and the silicate produced by chemical modification constitute the modified layer; Step 4. Deionization and cooling: when the pulsed DC power supply enters the pulse interval, the voltage difference between the micro-grinding tool and the grinding fluid rapidly drops to zero, the discharge spark and the insulating gas film disappear, and the contact between the grinding fluid and the micro-grinding tool is restored; the grinding fluid flow cools the micro-grinding tool and the workpiece while discharge the ablation products; Step 5. Grinding of the modified layer: the mechanical properties of the modified layer generated under the coupled effects of physical and chemical modification enabled by electrochemical discharge are significantly reduced; the micro-grinding tool is rotated at a high speed and continuously fed, than the modified layer is rapidly ground away by superabrasives on the micro-grinding tool. This results in the high-quality, high-efficiency and high-precision machining of the workpiece of silicon-based materials with brittle, hard, and difficult-to-conductive property; Step 6: Repeat the Steps 1 to 5, a number of micro structures can be produced on the surface of the workpiece as the micro-grinding tool is fed along the preset machining path.

The mass fraction range of each component of the grinding fluid is described as below: 50-70% deionized water, 16-26% $Na_2CO_3$, 8-16% $H_2O_2$, and 5-9% EDTA-Fe—Na. The grinding fluid doesn't react with the silicon-based materials at room temperature, but chemically reacts with the material at a high temperature to generate soft silicate; the reaction rate increases significantly as the temperature rise.

Controlling the electrical parameters of the pulsed DC power supply can achieve localized and efficient electrochemical discharge aided modification of the workpiece. This is able to realize the brittle-ductile removal transition of hard and brittle materials when greater values of grinding parameters are used than the single forms of micro-grinding, namely, the maximum undeformed chip thickness of the brittle-ductile removal transition is increased. The pulsed DC power supply has a peak voltage range of 0 V to 100 V, a pulse width of 0.1 μs to 1 ms and a duty cycle of 0.1 to 0.8.

The micro-grinding tool conducts precise feeding to the workpiece. The rotational speed of the micro-grinding tool is greater than 10,000 r/min, the grinding depth ranges from 0.2 μm to 25 μm, and the feed speed ranges from 0.1 mm/min to 10 mm/min.

Typical silicon-based materials include monocrystalline silicon, polycrystalline silicon, monocrystalline silicon carbide, polycrystalline silicon carbide, silicon-based ceramics, etc.

The material of the processing groove is non-conductive and alkali-proof, and can resist the erosion of the grinding fluid.

The electrochemical discharge-enabled micro-grinding process for micro-components of silicon-based materials stated in the invention has beneficial effects as below:

① The high-precision processing of silicon-based materials is achieved. Materials in the workpiece processing area are modified through the electrochemical discharge. The performance of the micro-grinding tool is more concentrated in grinding away the modified layer as well as a small amount of hard and brittle base materials. This weakens the mechanical force of the ultra-fine abrasive particles/workpiece, and improves shape retention of the micro-grinding tool and shape accuracy of the micro structure; the hard, brittle and difficult-to-conductive materials are softened by the thermal effect of electrochemical discharge spark, which can make the modification area of micro structures and the products adjustable and controllable, and enhance the dimensional accuracy of micro components; a micro-grinding tool with ultra-fine abrasive grains is used to grind away the modified layer can ensure the nano-scale surface roughness of hard and brittle materials.

② The high-efficiency processing of silicon-based materials is realized. Electrochemical discharge aided spark ablation of the workpiece leads to "physical softening" of the surface material of the workpiece, and the modified layer can removed easily and quickly when the abrasive particles on the micro-grinding tool scratch the workpiece; the instantaneous high thermal energy field of the discharge spark causes a rapid chemical reaction between the grinding fluid and silicon-based materials, that make the hard and brittle silicon-based material is efficiently and locally modified into a soft silicate layer, and "chemical softening" further improves the processing efficiency of silicon-based materials with brittle, hard, and difficult-to-conductive property.

③ The processing damage is reduced/eliminated. Compared with the single forms of micro-grinding, material modification increases the critical depth of cuts of brittle-ductile transition at low grinding speeds. This reduces or even eliminates damage to the grinding surface/subsurface. The material modification weakens the stress for mechanical elimination, and can reduce processing damage and defects such as chipping, breakage, and cracking of micro structures.

④ The shape retention and service life of the micro-grinding tool are improved. The mechanical properties of the modified silicon-based material are significantly reduced, which greatly decreases the mechanical force between the abrasive particles and the workpiece during grinding. This also lowers the evolution speed of abrasive wear, breakage, and shedding, improves the shape retention of the micro-grinding tool, and prolongs the service life of the micro-grinding tool.

⑤ Self-sharpening of the micro-grinding tool can be realized. During the electrochemical discharge, the coating material on the working surface of the micro-grinding tool is also ablated slightly and self-sharpening of the micro-grinding tool is achieved.

1. Micro-grinding tool; 1-1. Grinding tool base; 1-2. Electroplating layer; 1-3. Superabrasive; 2. Grinding fluid; 3. Workpiece; 3-1. Micro structure; 4. Auxiliary electrode; 5. tank; 6. Pulsed DC power supply; 7. Gas film; 8. Discharge spark; 9. Hydrogen bubble; 10. Modified layer; 10-1. HAL; 10-2. Silicate.

DETAILED EMBODIMENT

The technical solution of the present invention is further described by specific examples in conjunction with the accompanying drawings below.

Figure 1:
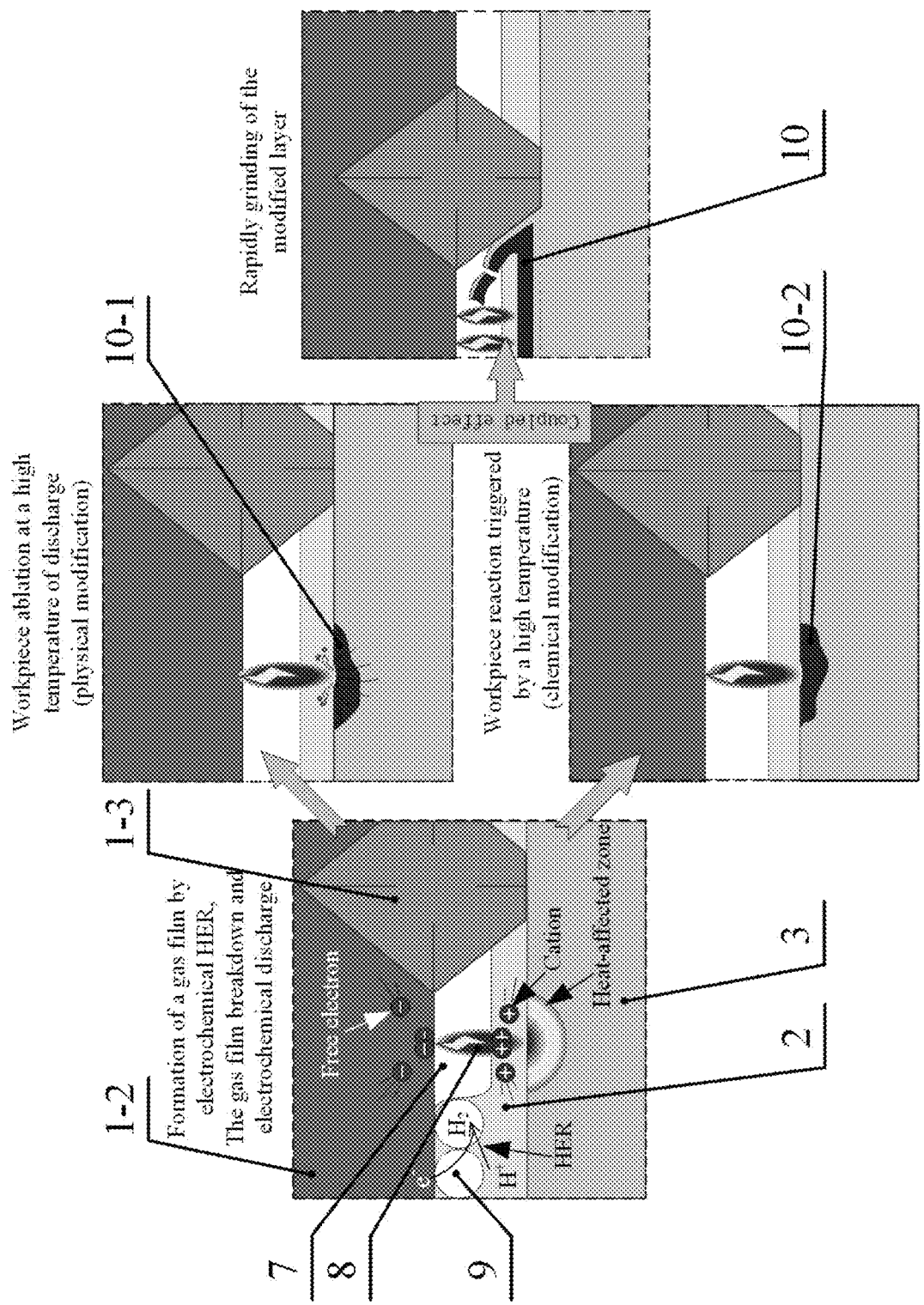
FIG. 1 A schematic diagram of the processing principle of the present invention.
Figure 2:
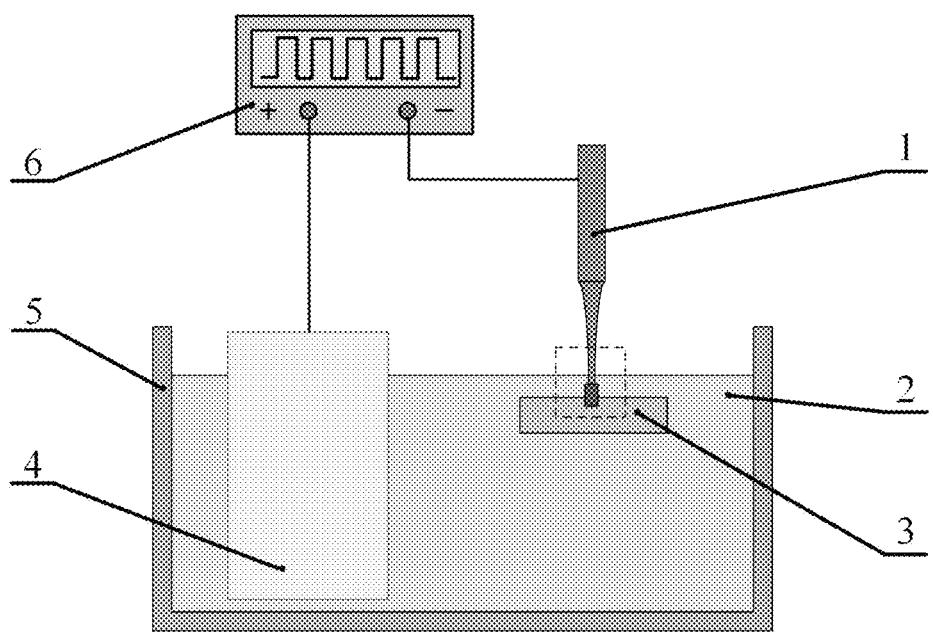
FIG. 2 A schematic diagram of the device required by the present invention.
Figure 3:
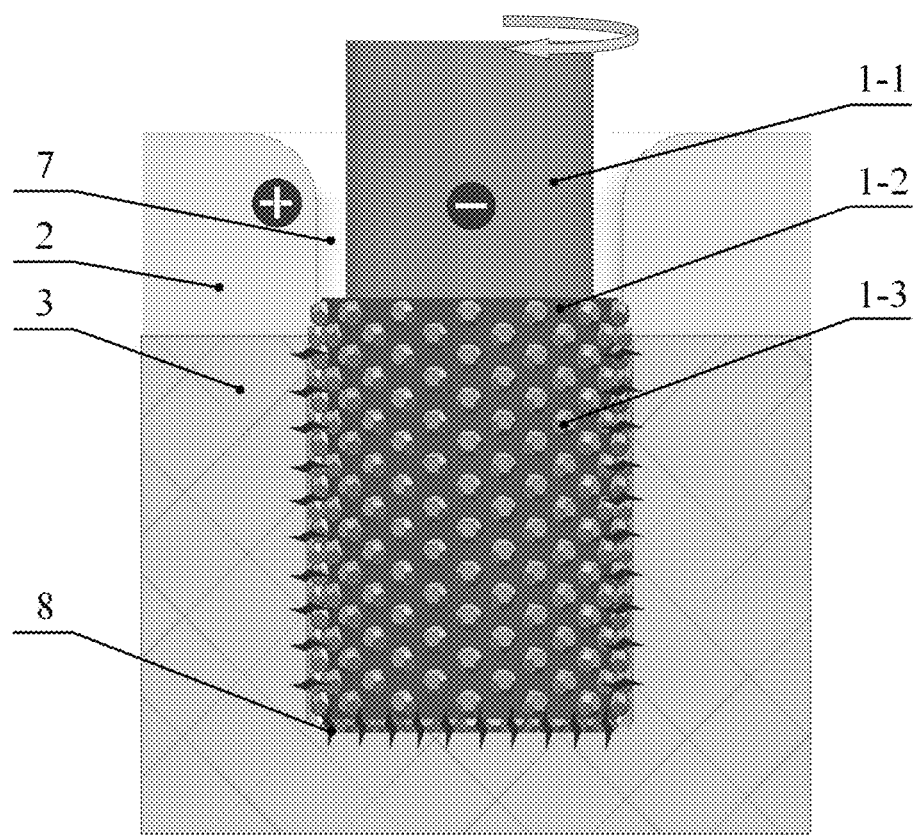
FIG. 3 A partial enlarged view of the grinding head portion of the micro-grinding tool in FIG. 2.

A method for electrochemical discharge-enabled micro-grinding process for silicon-based materials. The device required by the process are shown in FIGS. 2 and 3, including the micro-grinding tool (1), the grinding fluid (2), the monocrystalline silicon carbide (SiC) workpiece (3), the auxiliary electrode (4), the processing groove (5), and the pulsed DC power supply (6). The micro-grinding tool (1) and the auxiliary electrode (4) are respectively connected to the negative and positive electrodes of the pulsed DC power supply (6) and are immersed in the processing groove (5) containing the grinding fluid (2) to serve as the electrochemical cathode and anode, respectively. The monocrystalline SiC workpiece (3) is located adjacent to the micro-grinding tool (1); the micro-grinding tool (1) consists of the tungsten material grinding tool base (1-1), the electroplated nickel layer (1-2) and diamond abrasives (1-3). The size of the auxiliary electrode (4) is 20 times that of the micro-grinding tool (1).

Figure 4:
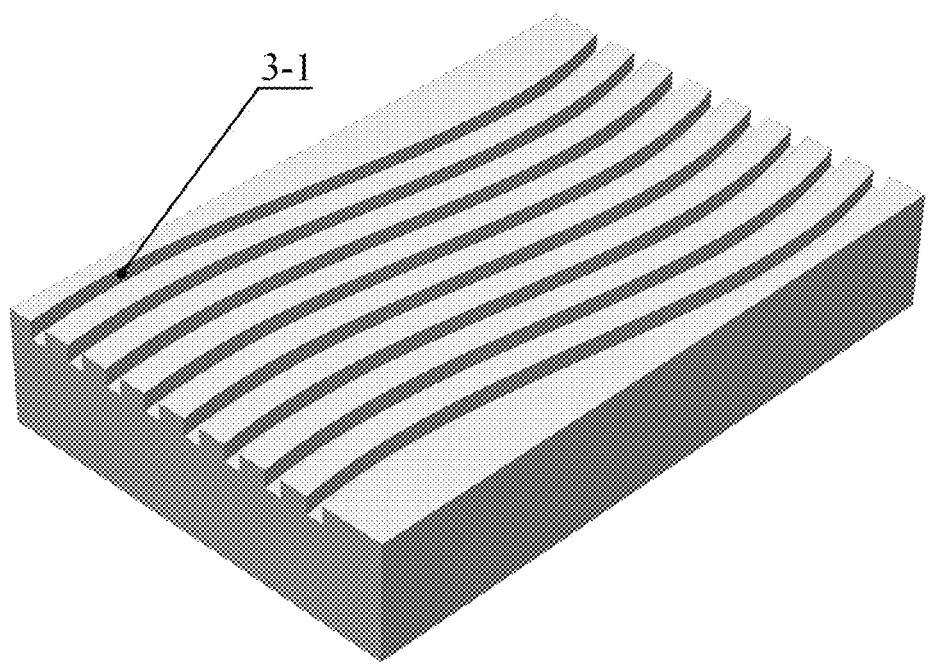

As shown in FIG. 4, this example aims to show the production of eight micro structures (3-1) of flow channel on the surface of the monocrystalline SiC workpiece (3), using the process of the present invention.

Before machining, the grinding fluid (2) was prepared according to the chemical reaction conditions of the monocrystalline SiC material of the workpiece (3); 68 wt % deionized water and 16 wt % $Na_2CO_3$ were used as the base fluid of the grinding fluid (2), 10 wt % $H_2O_2$ was added as the oxidant, and 6 wt % EDTA-Fe—Na was added as the catalyst; the mixed grinding fluid (2) doesn't react with monocrystalline SiC at the room temperature but reacts with it at a high temperature to produce silicate (10-2), and the reaction rate increases significantly as the temperature rise.

Based on the aforesaid device and the grinding fluid (2) at a specific ratio, the technical solution of the present invention is implemented by following steps of processing.

Step 1. Formation of gas film (7) by electrochemical HER: set the pulse width of the pulsed DC power supply (6) to 60 μs, the duty cycle to 0.2, and the peak voltage to 40 V; when the current of the pulsed DC power supply (6) flows through the loop, the negative potential from the negative electrode of the pulsed DC power supply (6) loaded on the micro-grinding tool (1) cause the $H^+$ ions in the grinding fluid (2) to obtain electrons from the surface of the micro-grinding tool (1) and to generate $H_2$. This represents the hydrogen bubbles (9) are generated by electrochemical HER and adhere to the surface of the micro-grinding tool (1). Than the multiple hydrogen bubbles (9) are gradually converge and merge to form an insulting gas film (7), and the insulating gas film (7) separate the micro-grinding tool (1) from the grinding fluid (2), thus, the HER is terminated; meanwhile, the positive potential from the positive electrode of the pulsed DC power supply (6) loaded on the auxiliary electrode (4) cause the $OH^-$ ions in the grinding fluid (2) to lose electrons and to generate $O_2$. This represents the oxygen bubbles are generated by electrochemical OER, since the size of the auxiliary electrode (4) is 20 times that of the micro-grinding tool (1) and the generation rate of oxygen bubbles is only half of the hydrogen bubbles (9), the auxiliary electrode (4) is unable to form a gas film.

Step 2. Electrochemical discharge: under the action of the voltage of the pulsed DC power supply (6), a large number of charged particles will accumulate on both sides of the insulating gas film (7) and a local strong electric field is generated wherein free electrons with negative charges gather on the micro-grinding tool (1), and $Na^+$, $Fe^{2+}$, and $H^+$ ions gather in the grinding fluid (2); when the critical voltage is reached, the micro-grinding tool (1) starts to emit field electrons, and the field electrons (accelerated by the electric field) bombard the hydrogen molecules in the insulating gas film (7), ionize them and release more electrons. This process develops like an avalanche, during which the insulating gas film (7) is quickly broken down and a discharge channel is generated between the micro-grinding tool (1) and the grinding fluid (2); meanwhile, the micro-grinding tool (1) continuously emits electrons to transfer to the grinding fluid (2), the $Na^+$, $Fe^{2+}$, $H^+$ ions (accelerated by the electric field) in the grinding fluid (2) also bombard the surface of the micro-grinding tool (1); the high-speed directional movement of the charged particles in the discharge channel leads to an electrochemical discharge accompanied by discharge spark (8).

Step 3. Modification of material of the monocrystalline SiC workpiece (3): when the charged particles in the discharge spark (8) collide with each other or hit the micro-grinding tool (1) and the grinding fluid (2) at a high speed, their kinetic energy is rapidly converted into thermal energy and a high-energy local heat source is generated instantaneously, namely, the thermal effect of the discharge spark (8). Under the action of the thermal effect of the discharge spark (8), the adjacent monocrystalline SiC workpiece (3) is directly ablated; the materials of the SiC workpiece (3) located in the discharge center absorb the heat flux with maximum density. The temperature of a small amount of SiC materials can be raised to the gasification temperature, then a sublimation occurs and such material are eliminated under the action of the explosive force and local thermal shock force generated by the discharge spark (8). The temperature of the monocrystalline SiC workpiece (3) located adjacent to the discharge center rises rapidly under the action of the thermal effect of the discharge spark (8). Due to an extremely short action time of the discharge spark (8), the heat flux absorbed by the material adjacent to the discharge center has no time to diffuse to the surrounding substrate. This results in a sudden temperature change followed by the generation of a HAL (10-1). The numerous thermal cracks and lattice distortion caused by the ablation of discharge sparks (8) in the HAL (10-1) reduces the mechanical properties of the HAL (10-1); thereby, the ablation and softening of the monocrystalline SiC workpiece (3) are achieved, which represent the physical modification of the surface material of the monocrystalline SiC workpiece (3); physical softening is conducive to the rapid elimination of the modified layer (10) when the diamond abrasives (1-3) on the micro-grinding tool (1) subsequently scratch the monocrystalline SiC workpiece (3), that improving the processing efficiency. Due to the thermal effect of discharge sparks (8), the electroplated nickel layer (1-2) on the working surface of the micro-grinding tool (1) is slightly ablated, it ensures that the diamond abrasives (1-3) on the micro-grinding tool (1) have sufficient height of protrusion and achieve self-sharpening. In other words, the micro-grinding tool (1) can always maintain a sharp state in grinding and have a more stable performance Meanwhile, the thermal energy generated by the thermal effect of discharge sparks (8) acts on the monocrystalline SiC workpiece (3) as well as on the grinding fluid (2) to increases their temperature. The increase in temperature causes a series of reactions between the SiC workpiece (3) and the grinding fluid (2). The chemical reactions includes $H_2O_2$ in the grinding fluid (2) under the catalysis of $Fe^{2+}$ can produce *OH with strong oxidizing properties. The solid-liquid phase oxidation reaction of monocrystalline SiC and *OH occurs to breaks the Si—C bond and combines it into a Si—O bond to generate $SiO_2$ which have greater bond energy. The $SiO_2$ further reacts with OH⁻ in the grinding fluid (2) to generate silicate (10-2). The specific chemical reaction formulas are presented as below:

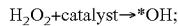

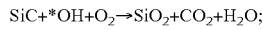

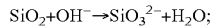

The instantaneous high-energy thermal field of discharge sparks (8) causes a rapid chemical reaction between the grinding fluid (2) and monocrystalline SiC workpiece (3). Finally, the surface material of hard and brittle monocrystalline SiC workpiece (3) is converted into the soft silicate (10-2), which represents the chemical modification of the surface material of the monocrystalline SiC workpiece (3); the efficient chemical softening further improves the modified layer (10) machining efficiency of subsequent processing by the micro-grinding tool (1). Moreover, using high temperature generated by electrochemical discharge for softening can make the modification area and the products of the monocrystalline SiC workpiece (3) adjustable and controllable, which can improving the dimensional accuracy of the micro structures (3-1) of flow channel.

Step 4. Deionization and cooling: When the pulsed DC power supply (6) enters the pulse interval, the voltage difference between the micro-abrasive tool (1) and the grinding fluid (2) sharply drops to zero; the discharge channel gradually shrinks and collapses, and the discharge spark (8) disappears after the support from the electric field is lost. Under the action of the buoyancy of the grinding fluid (2) and the impact force of discharge sparks (8), the insulating gas film (7) is shattered and loses its integrity. The contact between the grinding fluid (2) and the micro-grinding tool (1) is restored, the grinding fluid (2) flow cools the micro-grinding tool (1) and the monocrystalline SiC workpiece (3) while discharge the products of ablation.

Step 5. Grinding of the modified layer (10): the surface layer material of the monocrystalline SiC workpiece (3) located in the discharge-affected region is transformed into a modified layer (10) with significantly reduced mechanical properties under the action of coupled effects of physical and chemical modification. When the micro-grinding tool (1) performs micro-grinding at a rotational speed of 60,000 r/min, a feeding rate of 500 μm/min, and a grinding depth of 5 μm, the modified layer (10) is rapidly ground away under the action of mechanical shear stress of the diamond abrasives (1-3) on the micro-grinding tool (1). This enables the performance of the micro-grinding tool (1) to be more concentrated in the grinding of a small amount of hard and brittle monocrystalline SiC base materials and weakens the mechanical force between the diamond abrasives (1-3) and the monocrystalline SiC workpiece (3). Meanwhile, the shape retention of the micro-grinding tool (1) and the shape accuracy of the micro structures (3-1) of flow channel are improved; compared with the single forms of micro-grinding, the critical depth of cuts for the brittle-ductile removal transition of the micro-grinding tool (1) increases at the same grinding speed, thus, it is easier to achieve the removal in ductile domain when grinding monocrystalline SiC workpiece (3). Doing so may reduce or even eliminate processing damages to the surface/subsurface and processing defects such as chipping, breakage and cracking. Meanwhile, the elimination of the modified layer (10) by the ultra-fine diamond abrasives (1-3) also enables the micro structures (3-1) of flow channel to have nano-scale surface roughness after processing.

Step 6. Repeat steps 1 to 5, the micro-grinding tool (1) is fed along the preset machining path. Under the electric supply of the pulsed DC power supply (6), the micro-grinding tool (1) continuously performs efficient localized modification on the to-be-processed area of the monocrystalline SiC workpiece (3); meanwhile, the generated modified layer (10) is quickly ground away, and a large number of micro structures (3-1) of flow channel are produced on the surface of the monocrystalline SiC workpiece (3); due to a significant decrease in the mechanical properties of the modified monocrystalline SiC workpiece (3), the mechanical force between the micro-grinding tool (1) and the monocrystalline SiC workpiece (3) is greatly reduced. This slows the speed of the wear, breakage and shedding of the diamond abrasives (1-3), improves the shape retention of the micro-grinding tool (1) and prolongs its service life.

According to the aforesaid processing process, the process of the present invention realizes the high-precision, high-efficiency and low-damage machining of the micro structures (3-1) of flow channel on the surface of the monocrystalline SiC workpiece (3); the micro-grinding tool (1) has a long service life and can be self-sharpened; adjusting the ratio of the grinding fluid (2) and the other aforesaid processing parameters is applicable to machining of all kinds of hard and brittle silicon-based materials that are difficult-to-conduct electricity and have high-melting point. It effectively resolves the defects of existing methods for processing micro components of hard and brittle silicon-based materials that are difficult-to-conduct electricity and have high-melting point.

The specific description of the foregoing embodiment is only used to elaborate the present invention explicitly, not to limit the scope of the present invention. Any equivalent replacement and modification and so on made within the scope of the present invention are in the protection scope of the invention.

The invention claimed is:

1. A silicon-based material micro-part electrochemical discharge energizing fine grinding method, the electrochemical discharge auxiliary fine grinding device needed by the method comprises a micro-grinding tool (1), a grinding liquid (2), a workpiece (3), an auxiliary electrode (4), a tank (5) and a pulse direct current power supply (6);

the grinding liquid (2) is filled in the tank (5); the micro-grinding tool (1), the workpiece (3) and the auxiliary electrode (4) are soaked in the grinding liquid (2);

the micro-grinding tool (1) is composed of a conductive grinding tool base body (1-1), a conductive electroplated layer (1-2) and an insulating super-hard abrasive material (1-3);

the micro-grinding tool (1) is connected with negative electrode direct current power supply (6) to form the negative electrode the grinding liquid (2) is composed of $H_2O_2$, $Na_2CO_3$, EDTA-Fe—Na and deionized water, and the grinding liquid has conductivity; the material of the workpiece (3) is a hard and brittle conductive silicon-based material which needs to process a large amount of micro-structure (3-1) on the surface, the workpiece (3) is placed near the micro-grinding tool (1); the auxiliary electrode (4) is composed of a large inert conductive material, positive electrode with the pulse direct current power supply (6), and the conductive grinding liquid (2), a positive electrode size of the auxiliary electrode (4) is 1 to 2 orders of magnitude larger than the micro-grinding tool (1);

wherein the processing process is as follows:

step one, electrochemical reaction hydrogen evolution film: when the current of the pulse direct current power supply (6) passes through the loop, the micro-grinding tool (1) generates electrochemical hydrogen evolution reaction the grinding liquid (2), H+ in the grinding liquid (2) negative electrode to obtain electron generating hydrogen bubbles (9) and attached on the outer circumference of the micro-grinding tool (1), multiple hydrogen bubbles (9) are fused to form an insulating gas film (7), the insulating gas film (7) separates the micro-grinding tool (1) from the grinding liquid (2), and hydrogen evolution reaction; at the same time an oxygen evolution reaction occurs at the auxiliary electrode (4), the OH⁻ of the grinding liquid (2) loses an electron to generate $O_2$, because the size of the auxiliary electrode (4) is 1 to 2 orders of magnitude larger than the micro-grinding tool (1) the auxiliary electrode (4) is not enough to form an air film;

step two, electrochemical discharge: under the action of the voltage of the pulse direct current power supply (6), two sides of the insulating gas film (7) accumulate a plurality of charged particles and form a local strong electric field, wherein the micro-grinding tool (1) is aggregated with free electrons, the grinding liquid (2) is aggregated with positive ions, when the voltage reaches the critical discharge voltage, the insulating film (7) is broken down, a discharge channel is formed between the micro-grinding tool (1) and the grinding liquid (2), the charged particles form electrochemical discharge and generate discharge spark (8) in the high speed directional movement of the discharge channel;

step three, material modification of the workpiece (3): the discharge spark (8) directly ablating the adjacent workpiece (3), the workpiece (3) is located in the discharge centre of a small amount of material temperature and can be increased to the melting, gasification temperature so as to be directly etched; the workpiece (3) is located near the discharge center of the material, the temperature is suddenly changed to generate heat influence layer (10-1) so as to realize the ablation and softening of the workpiece (3), namely the physical modification of the surface material of the workpiece (3); at the same time, the thermal energy generated by electrochemical discharge acts on the piece workpiece (3) and the grinding liquid (2) and makes the temperature rise, the temperature rise promotes the chemical reaction of the workpiece (3) of the silicon-based material and the grinding liquid (2), the chemical reaction comprises: $H_2O_2$ in the grinding liquid (2) generates *OH under the catalysis of $Fe^{2+}$, reacting the *OH with the silicon-based material to generate $SiO_2$, wherein the $SiO_2$ further reacts with the OH⁻ generated by the $Na_2CO_3$ in the grinding liquid (2) to generate the silicate (10-2), finally, the surface layer material of the workpiece (3) is converted into the soft silicate (10-2) material by the hard and brittle silicon-based material, namely the chemical modification of the surface material of the workpiece (3); the heat affected layer (10-1) generated by physical modification and the silicate (10-2) generated by chemical modification together form a modified layer (10), by controlling the electric parameter of the pulse direct current power supply (6), capable of realizing localized electrochemical discharge modification of the workpiece (3);

step four, cooling pulse direct current power supply (6) enters the pulse interval the voltage between the micro-grinding tool (1) and the grinding liquid (2) is reduced to zero, the discharge spark (8) and the insulating gas film (7) disappear, the grinding liquid (2) and the micro-grinding tool (1) are contact the grinding liquid (2) cools the micro-grinding tool (1) and the workpiece (3), and discharges the etching product;

step five, grinding the modified layer (10): the mechanical property of the modified layer (10) generated under the electrochemical discharge physical modification and chemical modification coupling is reduced, the micro-grinding tool (1) rotates at high speed and continuously feeds current, the modified layer (10) is grinded by the ultra-hard grinding material (1-3) on the micro-grinding tool (1), the generation of the modified layer (10) increases the maximum non-deformation chip thickness of the fine grinding technique brittle-plastic domain removing transition so that the hard brittle workpiece material removing is changed from brittle removing direction to relatively stable ductility removing direction so as to realize high precision processing of hard and brittle conductive silicon-based material workpiece (3); and step six, repeating step one to step five, the micro-grinding tool (1) feeding along the preset processing path, the surface of the workpiece (3) is processed with a large amount of micro-structure (3-1).

2. The electrochemical discharge energizing fine grinding method for micro-part of silicon-based material according to claim 1, wherein the grinding liquid's (2) component mass fraction ranges comprise: 50 deionized water up to 70%, $Na_2CO_3$ 16% to 26%, $H_2O_2$ 8% to 16%, and EDTA-Fe—Na 5% to 9%.

3. The micro-grinding method for electrochemical discharge of micro-part of silicon-based material according to claim 1, wherein the processing rotating speed of the micro grinding tool (1) is more than 10,000-60,000 r/min, the grinding depth is 0.2 microns to 25 microns, the feeding speed range is 0.1 mm/min to 10 mm/min.

* * * * *